United States Patent [19]

Murakami

[11] Patent Number: 5,790,711
[45] Date of Patent: Aug. 4, 1998

[54] IMAGE PROCESSING APPARATUS HAVING A SMOOTHING FUNCTION WHICH REFERENCES A BI-LEVEL PIXEL PATTERN ON A MAIN SCAN LINE WHEN A PREDETERMINED AREA HAS A SPECIFIC BI-LEVEL PIXEL PATTERN

[75] Inventor: Yasuyuki Murakami, Uji, Japan

[73] Assignee: Murata Kikai Kabushiki Kaisha, Kyoto, Japan

[21] Appl. No.: 763,109

[22] Filed: Dec. 10, 1996

[30] Foreign Application Priority Data

Dec. 15, 1995 [JP] Japan ................ 7-327682

[51] Int. Cl.$^6$ .............. G06K 9/40; G06K 9/44; G06T 5/06; H04N 1/409
[52] U.S. Cl. .............. 382/267; 382/264; 382/275; 358/463
[58] Field of Search .............. 382/275, 266, 382/267, 269, 264, 260, 261, 254, 299; 358/447, 463

[56] References Cited

U.S. PATENT DOCUMENTS

| | | | |
|---|---|---|---|
| 4,510,618 | 4/1985 | Ataman et al. | 382/275 |
| 4,827,533 | 5/1989 | Tanaka | 382/264 |
| 5,561,724 | 10/1996 | Kido et al. | 382/264 |
| 5,649,031 | 7/1997 | Nakamura et al. | 382/254 |

*Primary Examiner*—Scott Rogers
*Attorney, Agent, or Firm*—Armstrong, Westerman, Hattori, McLeland & Naughton

[57] ABSTRACT

An image processing apparatus capable of normally carrying out correct and moreover highly precise smoothing while preventing the complication of the smoothing process and which is able to reliably carry out the smoothing process even when the line density of the image data is multiplied by a predetermined factor. When the black-white pattern of pixel data in a predetermined area is a specific pattern, the judging and line density conversion circuit determines whether a predetermined pixel data is black or white by referring to the black-white pattern of pixel data existing in the main scanning direction of the pixel data as well as the black-white pattern of pixel data existing in a predetermined area. As the line density of the image data can be simultaneously multiplied by a predetermined factor, more precise smoothing is possible.

6 Claims, 7 Drawing Sheets

IMAGE PROCESSING APPARATUS HAVING A SMOOTHING FUNCTION WHICH REFERENCES A BI-LEVEL PIXEL PATTERN ON A MAIN SCAN LINE WHEN A PREDETERMINED AREA HAS A SPECIFIC BI-LEVEL PIXEL PATTERN

BACKGROUND OF THE INVENTION

1. Technical Field

The present invention relates to an image processing apparatus utilized on a facsimile device or the like having a smoothing function that decides whether a predetermined pixel data in the reception data is black or white based on a plurality of black-white pixel data patterns existing around the same pixel data.

2. Background Art

On a facsimile device utilizing this kind of image processing apparatus, when reception image data is to be printed out, a smoothing process is carried out which decides whether pixel data in that reception image data (below, known as target pixel data) is white or black according to pixel data existing around the target pixel. In short, it determines whether a target pixel is black or white so that it harmonizes more naturally with the plurality of black-white pixel data surrounding that same pixel data. Accordingly, when image data sent from the transmitting device is received, a more natural printed image of higher quality which the user finds easier to see can be obtained by the smoothing and printing on recording paper of that received image data. It should be noted that the phrase smoothing process is used in the broad sense and includes isolated point removal and the like.

When that smoothing process is carried out, conventional devices normally take from the reception data a dot matrix having 3×3 pixels as pixel data in a predetermined area and use the pixel data positioned in the center of that dot matrix as the target pixel data. Then determination of whether that target pixel data is black or white is carried out based on the black-white pattern of the surrounding 8 pixels.

Generally, facsimile devices are provided with three scanning modes for scanning the document, these modes being normal mode, fine mode and superfine mode. In normal mode, the image on the document is scanned with the scanning line density in the sub-scanning direction at 3.85 lines/mm, double that at 7.7 lines/mm for fine mode and double again at 15.4 lines/mm for superfine mode. That scanned image data is then transmitted to the receiver side device.

In response to this, when the aforementioned scanned image data is received by the receive side device and printed on the recording paper by the printer of the device, the resolution of the printer may be higher than the resolution of the received image data, in short, the recording line density of the printer of the receiver side device may be higher than the recording line density of the received image data. In this kind of case, the receiver side device carries out printing of the received image data after converting the line density of the received image data to a line density that corresponds to a recording line density of the printer. For example, when a line density of received image data is at 3.85 lines/mm corresponding to normal mode, if the recording line density of the printer is 15.4 lines/mm corresponding to superfine mode, then at the receiving side device, each line of data forming the reception data is recorded 4 times for one line of data meaning it is printed at a 4 times line density of the reception data in short at a line density of 15.4 mm/line.

Thus, when the line density of the received image data is lower than the recording line density of the printer of the facsimile device having a smoothing process function, line density conversion and smoothing processing must both be carried out on that received image data. However, when line density conversion and smoothing processing are carried out with respect to the received image data on a conventional device, the following problems arise.

Figure 7A:
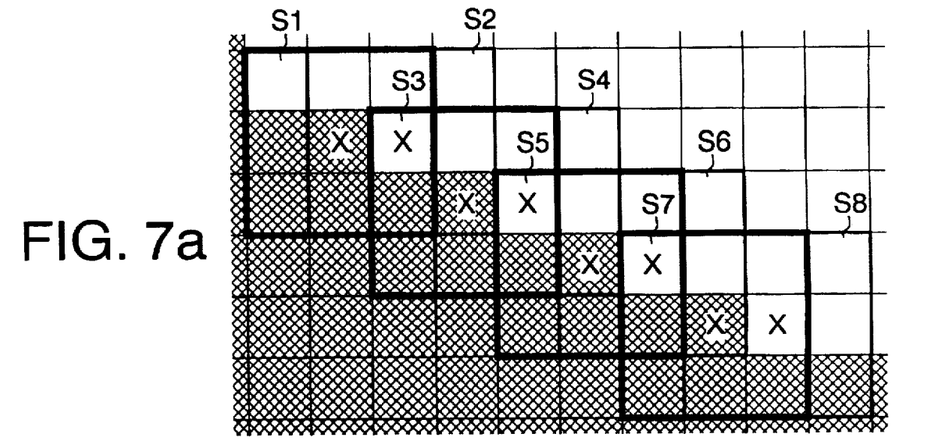
FIG. 7(a)–FIG. 7(c) show matrices, FIG. 7(a) showing an enlarged view of the matrices before processing, FIG. 7(b) showing an enlarged view of the matrices after smooth processing according to patterns of the present embodiment and FIG. 7(c) showing an enlarged view of the matrices after being conventionally processed.
Figure 11A:
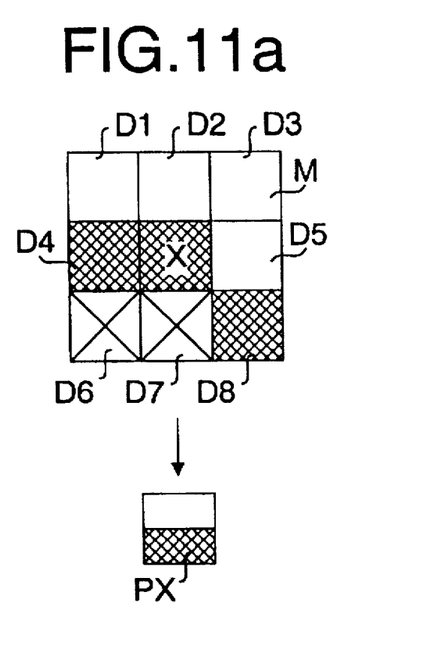
FIG. 11(a) and FIG. (b) are explanatory diagrams, each showing a normal pattern for the conventional smoothing process.
Figure 11B:
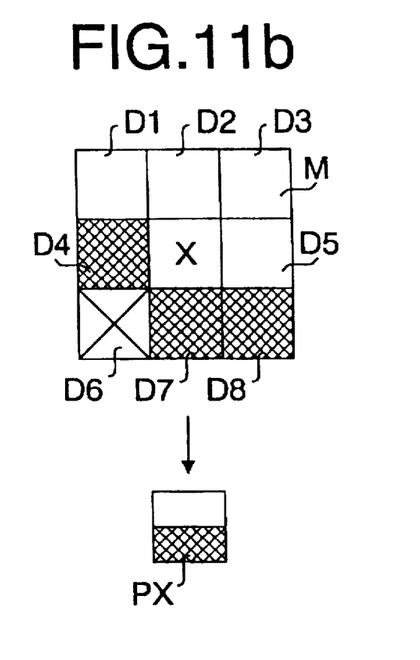

In short, suppose image data having a stepped contour as shown in FIG. 7(a) is received in fine mode and then the receiver attempts to smooth and print out this dot matrix image data after converting it to a superfine mode line density. The black-white pattern of pixel data for smoothing this dot matrix of FIG. 7(a) is shown in FIGS. 11 (a) and (b). (In each drawing, the diagonally lined part of each pixel data shows black pixel data and the spaces show white pixel data. Also, X indicate that the pixel data may be either black or white.)

Figure 7B:
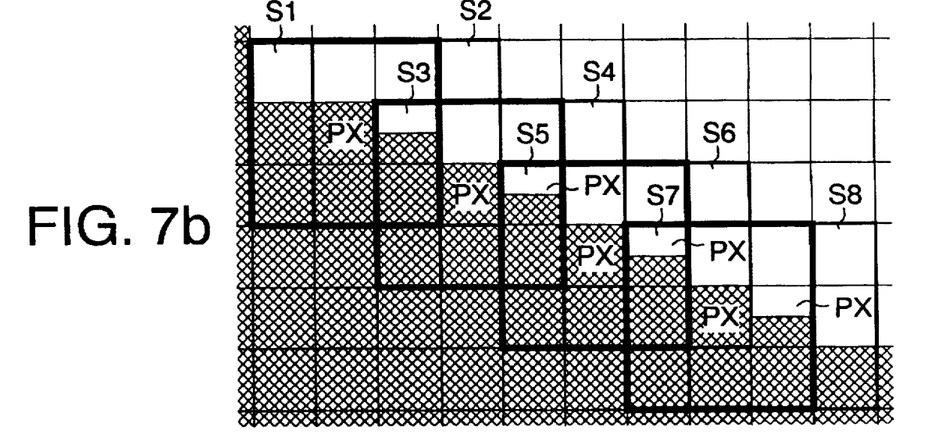
Figure 7C:
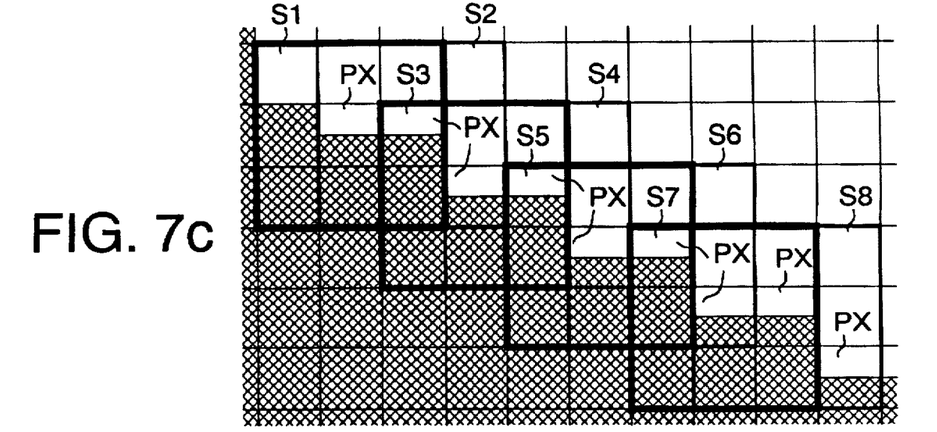

Firstly, supposing area S1 (shown in bold lines) having the 3×3 pixel data in FIG. 7(a) is read into the matrix production part M. This corresponds to the pattern of FIG. 11(a). Then, supposing area S2 (shown in bold lines) is read into the matrix production part M. This corresponds to the pattern of FIG. 11(b). Areas S3,S5,S7 of FIG. 7(a) correspond to the pattern in FIG. 11(a) and areas S4,S6,S8 correspond to the pattern in FIG. 11(b). Based on these patterns in FIGS. 11(a) and (b), the target pixel X is converted to double the line density so that the upper part is a white pixel data and the lower part is a black pixel data. However, when line density conversion and smoothing by this pattern is sequentially carried out, the positioning of the steps of black pixel data and white pixel data is simply shifted as shown in FIG. 7(c) and no benefit arises from carrying out the line density conversion and smoothing process.

Figure 8A:
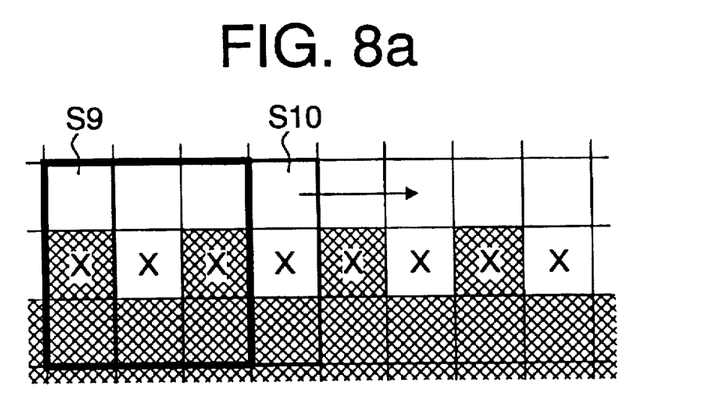
FIG. 8(a)–FIG. 8(c) show matrices, FIG. 8(a) showing an enlarged view of the matrices before processing, FIG. 8(b) showing an enlarged view of the matrices after smooth processing according to patterns of the present embodiment and FIG. 8(c) showing an enlarged view of the matrices after being conventionally processed.
Figure 12A:
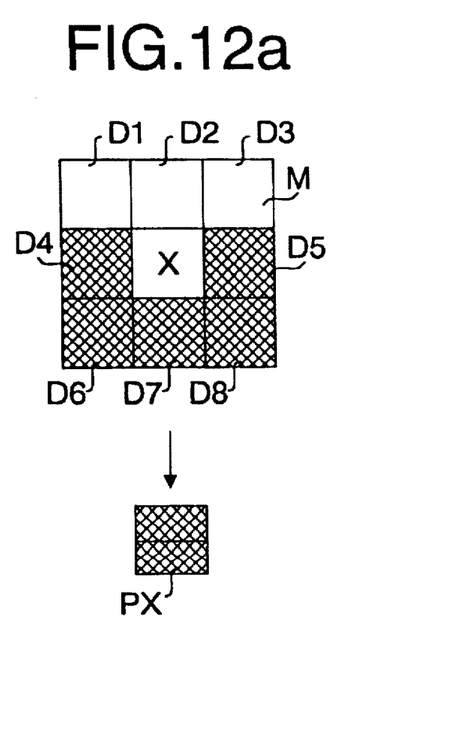
FIG. 12(a) and FIG. 12(b) are explanatory diagrams, each showing a normal pattern for conventional smoothing process.

Furthermore, supposing image data of a repetitive pattern of ridges and troughs as shown in FIG. 8(a) for example are received in fine mode. Firstly, the area S9 (shown in bold lines) having the 3×3 pixel data in FIG. 8(a) is read into the matrix production part M. This corresponds to the pattern of FIG. 12(a). Then, supposing area S10 (shown in bold lines) is read into the matrix production part M. This corresponds to the pattern of FIG. 12(b). Then, when this ridge-trough pattern is to be smoothed, FIGS. 12(a) and (b) exist as specific patterns of the black and white of the pixel data. The target pixel X is defined as black pixel data by the pattern of FIG. 12(a) and as white pixel data by the pattern of FIG. 12(b). As above, even if the smoothing process is carried out by these specific patterns, the ridge-trough shape is simply shifted by one dot and no benefit arises from carrying out the smoothing process.

The reason for the ineffective smoothing above is that there is a limit to the smoothing process by only looking at the 8 pixel data adjacent to the target pixel, due to the insufficiency of matching patterns in the dot matrix having the 3×3 pixel data. However, enlarging the read out dot matrix (for example 5×5) in order to solve this problem greatly increases the patterns of black and white adjacent to the target pixel data. In short, the processing for determining whether the target pixel data is black or white becomes extremely complicated. For example, when the smoothing process is realized using a ROM table, the capacity of the ROM table has to be increased and the process becomes complicated. Furthermore, in order to enlarge the dot matrix in the sub-scanning direction, the line buffer must be enlarged and this causes an increase in production cost of the device.

SUMMARY OF THE INVENTION

In order to solve the above mentioned problems it is a first object of the present invention to propose a device capable of always carrying out correct and moreover highly precise smoothing while preventing the complication of the smoothing process as much as possible. Further, it is a second object of the present invention to reliably carry out the smoothing process of the first object even when the line density of the image data is multiplied by a predetermined factor.

In order to realize the above objects, a first aspect is an image processing apparatus having a smoothing function that determines whether predetermined pixel data is black or white based on the black-white pattern of pixel data existing in a predetermined area, arranged with a judging means that determines whether a predetermined pixel data is black or white by referring to the black-white pattern of pixel data existing in main scanning direction of that same pixel data when the black-white pattern of pixel data in a predetermined area is a specific pattern.

According to the first aspect of the present invention with the aforementioned composition, when a black-white pattern of pixel data in a predetermined area is a specific pattern, the black-white pattern of pixel data existing in the main scanning direction of that pixel data is referred to by the judging means and judgment of whether a predetermined pixel data is black or white is carried out. In short, smoothing is normally carried out based on the pixel data of the predetermined area (for example the dot matrix having 3×3 pixel data) and only when necessary, is the pixel data in the main scanning direction referred to.

Due to the aspect above, not only the precision of the smoothing process is increased but also complications in the smoothing process can be prevented and smoothing of high precision can always be achieved. Further, since other pixel data in the main scanning direction are recognized, there is no need for increased line memory thus reducing cost.

Further, as a second aspect of the present invention above, line density conversion means for converting the line density of the image data by multiplying by a predetermined factor is also provided adjacent to the judging means of the first aspect of the invention.

According to the second aspect of the present invention, the target pixel data is converted by the line density conversion means to line density multiplied by the predetermined factor, but at that time, the target pixel data is simultaneously more finely smoothed by the judging means. Since more detailed smoothing is possible due to the line density conversion process, smoothing of high precision can be achieved.

Further, as a third aspect of the present invention, when all of the other pixels except for a predetermined pixel are either white or black, the aforementioned judging means judges the predetermined pixel to be the same pattern as the other pixels.

According to the third aspect of the present invention described above, when all pixels except for the target pixel are either black or white, the aforementioned judging means changes the target pixel in the black-white pattern of pixel data being opposite other pixels to a black-white pattern similar to the other pixels. In short, when the target pixel is solitary in terms of color compared to the surroundings, the black-white pattern of the pixel data existing in the main scanning direction of the pixel data of the target pixel is referred to and if all are white pixel data, the target pixel is changed to white and if all are black pixel data, the target pixel is changed to black. As a result, a solitary point are recognized with extremely high accuracy and such solitary point can be smoothed (erased) without complication.

Further, as a fourth aspect of the present invention, the predetermined area may be a n×m matrix and the black-white pattern of pixel data adjacent to this n×m matrix in the main scanning direction are referred to in order to judge whether the predetermined image pixel is black or white.

Further, as a fifth aspect of the present invention, the judging means refers to pre-smoothing pixel data. Accordingly, there is no requirement to memorize the post-smoothing process pixel data.

BRIEF DESCRIPTION OF THE DRAWINGS

FIG. 3(a)–FIG. 3(d) are explanatory diagrams, each showing one of the specific patterns of the nine pixel data read onto the matrix.

FIG. 6(a)–FIG. 6(c) are explanatory diagrams, each showing the resulting target pixel data which has been processed by smoothing and line density conversion of the present embodiment.

FIG. 10(a)–FIG. 10(e) are explanatory diagrams, each showing the resulting target pixel data which has been processed by smoothing and line density conversion of another embodiment.

DESCRIPTION OF THE PREFERRED EMBODIMENTS

Below, an embodiment realizing the image processing apparatus of the present invention in a facsimile device will be described based on the drawings.

A ROM (read only memory) 12 and RAM (random access memory) 13 are connected to a CPU (central processing unit) 11. ROM 12 controls the operations of the entire apparatus including the programs for smoothing and line density conversion. RAM 13 temporarily stores various information. An NCU (network control unit) 14 and a modem 15 are connected to the CPU 11. NCU 14 controls the connection between the telephone lines and the CPU 11 and is also provided with functions of transmitting a dial pulse corresponding to a called facsimile number and detecting a ringing tone. Modem 15 carries out modulation and demodulation of the transmission and reception signals.

Further, a scanning part 16, page memory 17 and smoothing process circuit 18 are connected to the CPU 11. Scanning part 16 is for reading the image on the document. Page memory 17 is for memorizing one page worth of received image data one line at a time. Smoothing process circuit 18 performs smoothing process of the image data conveyed from the page memory 17 and outputs it to a printer 19. The printer 19 includes a recording device such as electric photography or the like and prints images on the recording paper based on image data input from the smoothing process circuit 18. It should be noted that the printer 19 of the present embodiment carries out printing at a line density corresponding to superfine mode, in short at a line density of 15.4 lines/mm. Key input part 20 has various types of operation keys (not shown) such as a keypad for inputting facsimile numbers.

A ringing tone from a telephone exchange is transmitted based on a call from a caller and when that ringing tone is detected by the NCU 14, the CPU 11 makes a line with the calling side by controlling the NCU 14 and puts the device in a reception capable state. Then, after the exchange of predetermined facsimile procedure signals such as the CNG signal with the calling side, the CPU 11 transmits a DIS signal by controlling the modem 15. In short, in the facsimile device of the present embodiment, the calling side is informed by the DIS signal that as the printer 19 prints at a line density of 15.4 lines/mm, reception of image data scanned at a line density of 15.4 lines/mm is possible. Then the calling side transmits a DCS signal corresponding to that DIS signal. In short, when the document scanning mode is normal mode, the calling side informs the receiving side by the DCS signal that the scanned line density is the standard line density of 3.85 lines/mm.

Afterwards, when the scanned image data from the calling side is received, the CPU 11 temporarily stores that received image data in the RAM 13 and conveys and stores one page of document of that stored image data in the page memory 17 one line of data at a time. Following that, the CPU 11 sequentially sends the image data in the page memory 17 to the smoothing process circuit 18 one line of data at a time.

Figure 1:
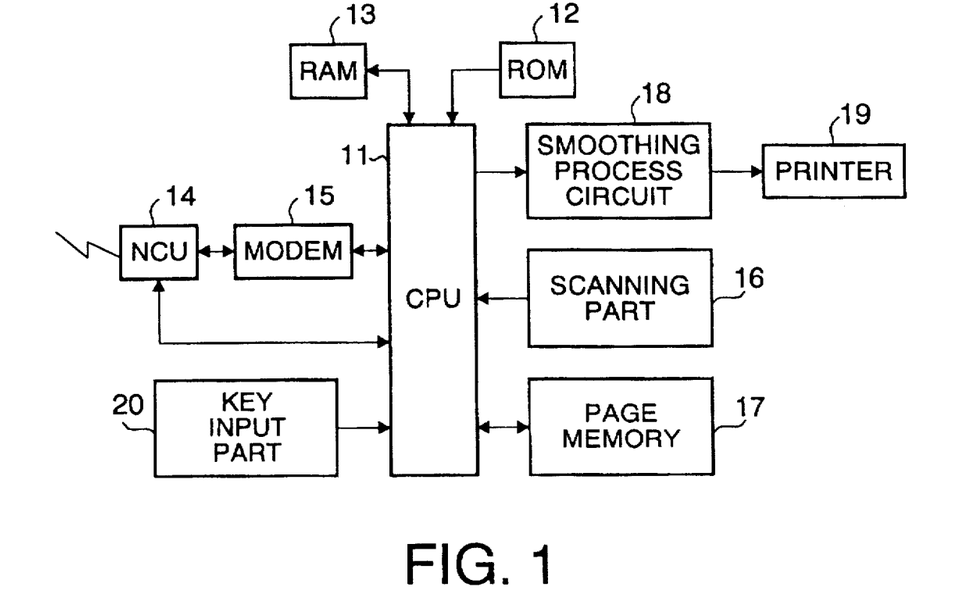
FIG. 1 is a circuit diagram realizing the present invention in a facsimile apparatus.
Figure 2:
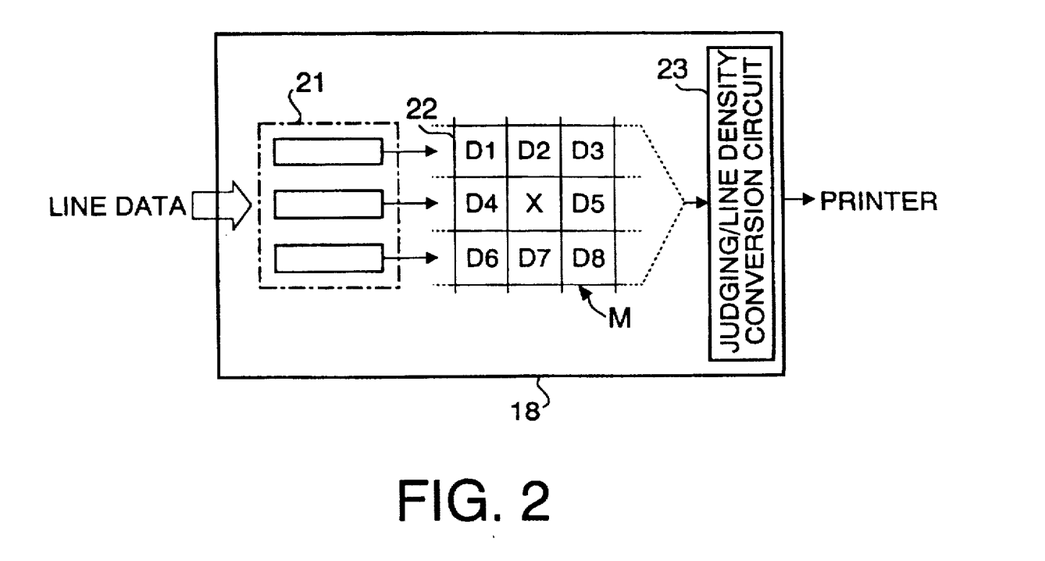
FIG. 2 is a schematic diagram of the smoothing circuit.

As shown in FIG. 2, the smoothing process circuit 18 includes a line buffer 21, pixel memory 22, judging/line density conversion circuit 23 as judging/line density conversion means. The line data sequentially conveyed from the page memory 17 is temporarily memorized three lines at a time in the line buffer 21. Pixel memory 22 is an aggregate of the 3×3 (9) pixel memory units and by these pixel memory units 22 a matrix M of a predetermined area showing a black-white pattern is formed. The line data memorized in the line buffer 21 is sequentially conveyed to the pixel memory 22 and moves one pixel at a time in the main scanning direction (horizontally when viewed in the drawings). Then the target pixel data X positioned in the center of the pixel memory 22 and the eight pixel data D1–D8 around that are output to the judging/line density conversion circuit 23 at each shift.

Judging/line density conversion circuit 23 carries out judging of the target pixel data X and converts the line density of that target pixel data X to the line density of predetermined factor corresponding to the recording line density of the printer 19. For example, when image data scanned at a standard line density of 3.85 lines/mm is received, the judging/line density conversion circuit 23 multiplies by a factor of 4 the line density of the target pixel data X which has been judged. Further, if the document scanning mode of the calling side is in fine mode (the line density of the transmitted image data is 7.7 lines/mm), the line density of the target image data X is multiplied by a factor of two. If the document scanning mode of the calling side is in superfine mode (the line density of the transmitted image data is 15.4 lines/mm), the judging/line density conversion circuit 23 does not carry out line density conversion as the line density (of the image data) is the same as that of the printer.

The judging/line density conversion circuit 23 recognizes the black-white pattern of the eight pixel data D1–D8. Then, when the color of the target pixel data X can be decided by only the eight pixel data D1–D8, the judging/line density conversion circuit 23 outputs the determined target pixel data X to the printer 19. Conversely, when the matrix M is determined to be a specific pattern where the target pixel data X cannot be decided simply by the eight pixel data D1–D8, the judging/line density conversion circuit 23 recognizes the black-white pattern of other pixel data in the main scanning direction of the pixel memory 22. Then, the determined target pixel data X is output to the printer 19.

Next, the black-white pattern of the eight pixel data D1–D8 in the matrix production part M which are judged to be a specific pattern by the aforementioned judging/line density conversion circuit 23 will be described. In addition, an example will be given of the black-white pattern of another pixel data in the main scanning direction of the pixel memory 22 when such a specific pattern as above has been determined. It should be noted that the document scanning mode of the calling side is presumed to be in fine mode with the line density of the transmitted data at 7.7 lines/mm. Accordingly, the line density of the target pixel data X judged by the judging/line density conversion circuit 23 is simultaneously multiplied by a factor of two. Further, in each drawing, the diagonal line in each pixel data shows black pixel data and each space indicates white pixel data. The place indicated by an X can be either black or white pixel data.

Figure 3A:
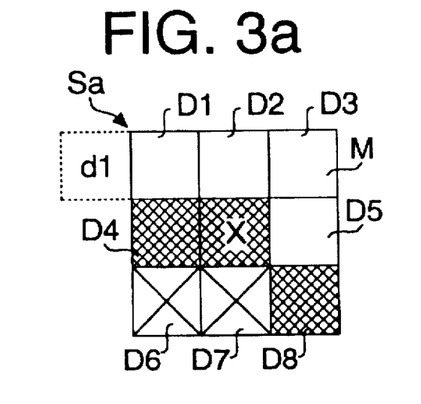
Figure 6A:
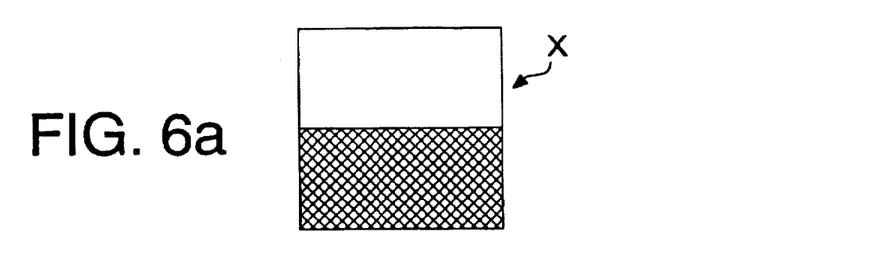
Figure 6B:
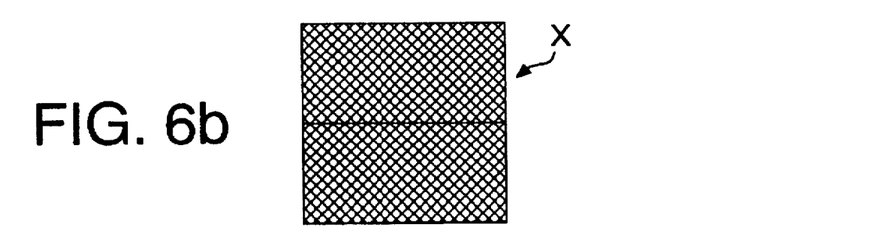

Firstly, when the black-white pattern of the target pixel data X and the eight pixel data D1–D8 in the matrix production part M is a specific pattern Sa as shown in FIG. 3(a), the judging/line density conversion circuit 23 also recognizes a new pixel data d1 adjacent to pixel data D1 in the main scanning direction. Then, if that new pixel data d1 is determined to be a white pixel data, the judging/line density conversion circuit 23 multiplies the line density of the target pixel data X by a factor of two so that the upper part is white pixel data and the lower part is black pixel data as shown in FIG. 6 (a). Conversely, if that new pixel data d1 is determined to be a black pixel data, the line density of the target pixel data X is multiplies by a factor of two so that both the upper and lower parts are black pixel data as shown in FIG. 6(b). Then, the target pixel data X which has been converted to either of the two patterns above is output to the printer 19.

Figure 3B:
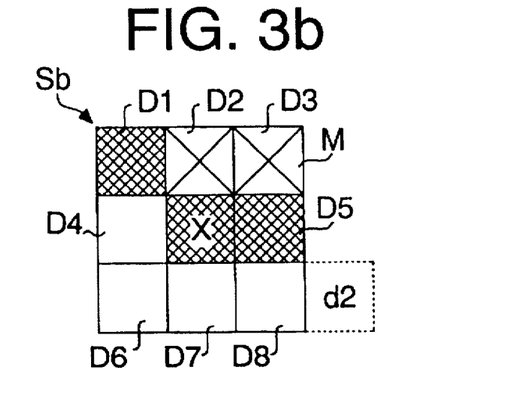
Figure 3C:
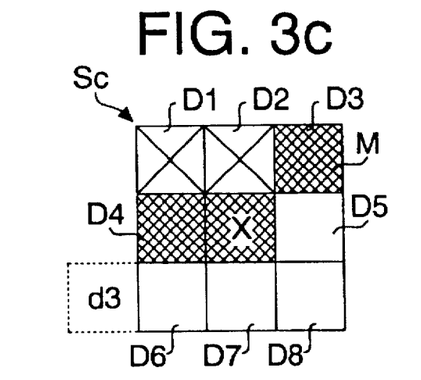
Figure 3D:
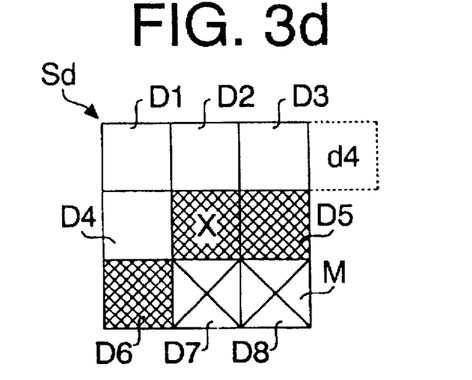

Furthermore, FIG. 3(b) is a specific pattern Sb being the matrix production part M of FIG. 3(a) rotated through 180 degrees. In this case also, the judging/line density conversion circuit 23 recognizes the new pixel data d2 adjacent to the pixel data D8 in the main scanning direction. Further, FIG. 3(c) and FIG. (d) shows specific patterns Sc and Sd being mirror images of the matrix production part M of FIGS. 3(a) and (b) respectively. Concerning the specific pattern Sc of FIG. 3(c), the judging/line density conversion circuit 23 recognizes the new pixel data d3 adjacent to the pixel data D6 in the main scanning direction. Further, concerning the specific pattern Sd of FIG. 3(d), the judging/ line density conversion circuit 23 recognizes the new pixel data d4 adjacent to the pixel data D3 in the main scanning direction. Determination is carried out by the judging/line density conversion circuit 23 of whether the new pixel data d2–d4 of FIGS. 2(b–d) is white pixel data or black pixel data. Then the target pixel data X converted to either black or white as a result of that determination is output to the printer 19.

Figure 4A:
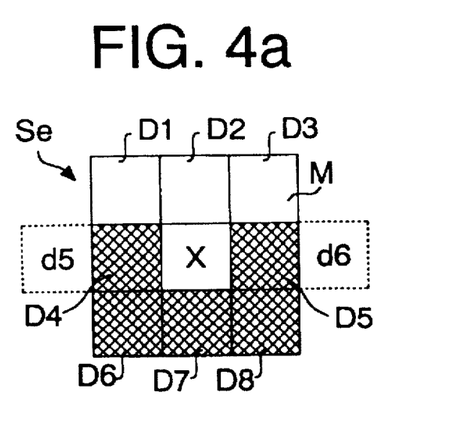
FIG. 4(a) and FIG. 4(b) are explanatory diagrams, each showing one of other specific patterns of the nine pixel data read onto the matrix.
Figure 4B:
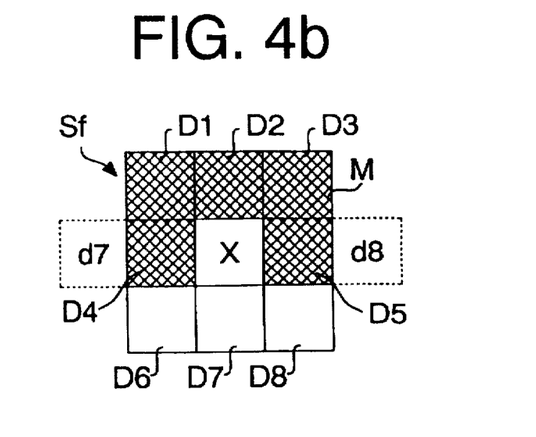
Figure 6C:
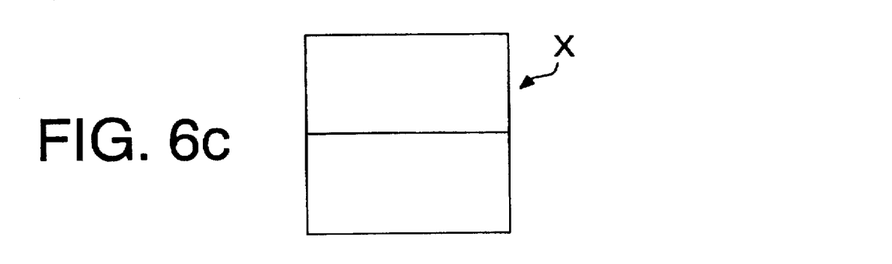

Next, when the black-white pattern of the target pixel data X and the eight pixel data D1–D8 in the matrix production part M is a specific pattern Se as shown in FIG. 4(a), the judging/line density conversion circuit 23 also recognizes new pixel data d1, d6 adjacent to pixel data D4, D5 respectively in the main scanning direction of the target pixel data X. If both d5 and d6 are black pixel data, both the upper part and lower part of the target pixel data X become black pixel data as shown in FIG. 6(b) and if one or both of d5 or d6 is white pixel data, both the upper part and lower part of the target pixel data X become white pixel data as shown in FIG. 6(c). Furthermore, FIG. 4(b) is a specific pattern Sf being the matrix production part M of FIG. 4(a) rotated through 180 degrees. With specific pattern Sf, when both the new pixel data d7, d8 are black pixel data, both the upper part and lower part of the target pixel data X become black pixel data as shown in FIG. 6(b) and if one or both of d7 or d8 is white pixel data, both the upper part and lower part of the target pixel data X become white pixel data as shown in FIG. 6(c).

Figure 5:
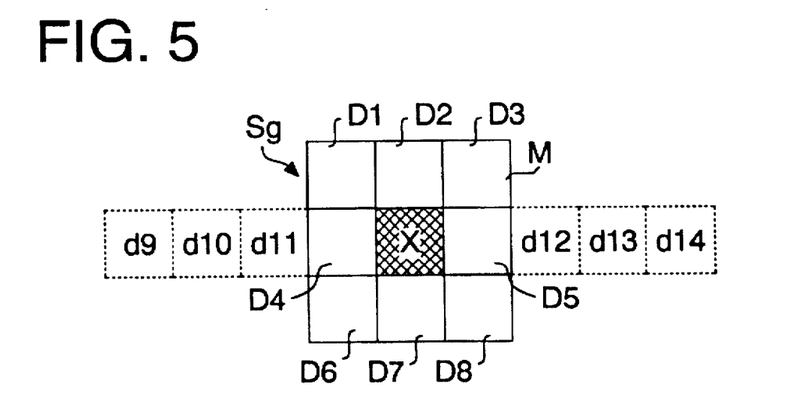
FIG. 5 is an explanatory diagram of yet other specific patterns of the nine pixel data read onto the matrix.

Next, when the black-white pattern of the target pixel data X and the eight pixel data D1–D8 in the matrix production part M is specific pattern Sg as shown in FIG. 5, the judging/line density conversion circuit 23 also recognizes new pixel data d9,d10,d11,d12,d13,d14 adjacent to pixel data D4 and D5 in the main scanning direction of the target pixel data X. If the pixel data D1–D8 and all of the new pixel data d9–d14 are white pixel data, both the upper part and lower part of the target pixel data X become white as shown in FIG. 6(c).

Supposing the pre-smoothing process image data is the pattern as shown in FIG. 7(a). In the present embodiment, the image data of after the smoothing process is the pattern shown in FIG. 7(b) Firstly, area S1 (bold) of FIG. 7(a) having 3×3 pixel data is read into the matrix production part M. This case is recognized by the judging/line density conversion circuit 23 as corresponding to the specific pattern Sa shown in FIG. 3(a) and the new pixel data d1 in the specific pattern Sa is black pixel data. Accordingly, in area S1, a pixel data PX in which both the upper part and lower part are black is output as shown in FIG. 7(b).

On the other hand, when area S2 (in bold) having a similar 3×3 pixel data is read out, as this is not one of the aforementioned specific patterns, it corresponds to a normal pattern where the target pixel data X is determined by the black-white pattern of the eight pixel data D1–D8 shown in FIG. 11(b). For this pattern, a pixel data PX having white pixel data for the upper part and black pixel data for the lower part is output as shown in FIG. 6(a). For area S3,S5,S7, processing similar to area S1 is carried out and for areas S4,S6,S8, processing similar to area S2 is carried out. When areas S1–S8 are subject to smooth processing, in accordance with these rules, the pattern shown in FIG. 7(b) is produced and a smooth diagonal line with few steps between the white pixel data and black pixel data is formed.

Figure 8B:
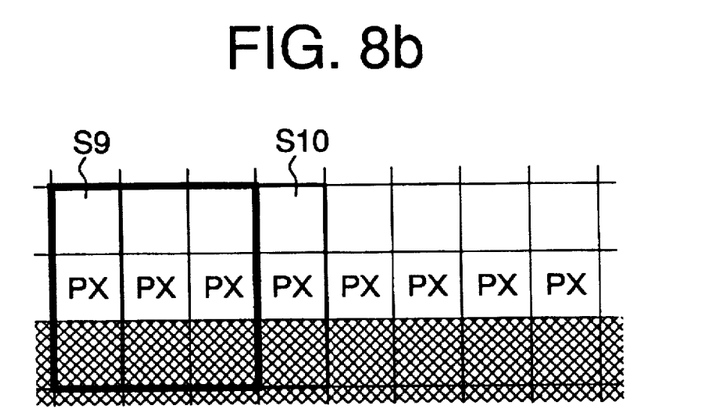
Figure 8C:
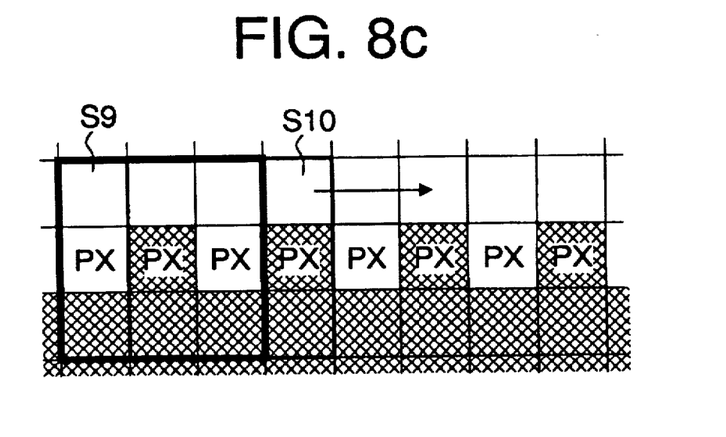

Furthermore, supposing the pre-smoothing process image data is the pattern as shown in FIG. 8(a), in the present embodiment, that image data is transformed to the pattern shown in FIG. 8(b) after the smoothing process. Firstly, suppose area S9 (bold) of FIG. 8(a) having 3×3 pixel data is read into the matrix production part M. This case is recognized by the judging/line density conversion circuit 23 as corresponding to the specific pattern Se shown in FIG.4 (a), and FIG. 7(a) shows that white pixel data are selected for the new pixel data d5 and d6 in the specific pattern Se. Accordingly, in area S9, both parts of the target pixel data are converted to white pixel data as shown in the aforementioned FIG. 6(c)

Figure 12B:
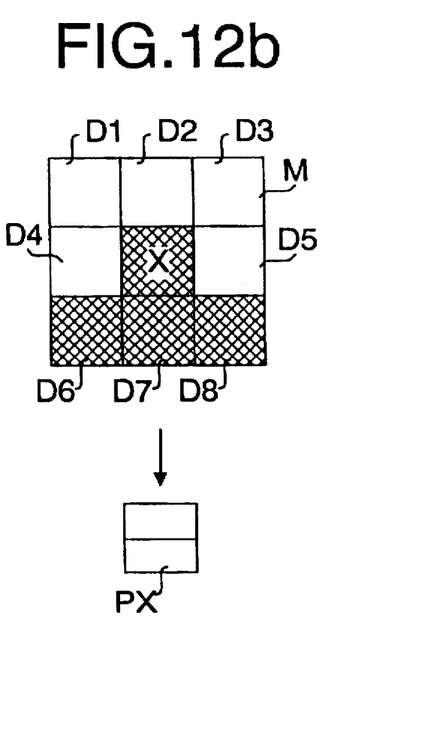

Next, when area S10 (in bold) having a similar 3×3 pixel data is read out, as this is not one of the aforementioned specific patterns, it corresponds to a normal pattern where the target pixel data X is determined by the black-white pattern of the eight pixel data D1–D8 shown in FIG. 12(b). This is not a specific pattern shown in FIGS. 3 and 4. In short, it is a normal pattern where the target pixel data X is determined by the black-white pattern of the eight pixel data D1–D8 and both the lower and upper part are converted to white pixel data as shown in FIG. 6(c). When subsequent smooth processing similar to that performed to areas S9,S10 is carried out along the scanning direction (to the right in the drawing), a pattern as shown in FIG. 8(b) is produced and the border between the white pixel data and black pixel data can be smoothed to a horizontal line with no ridges or troughs.

Figure 9:
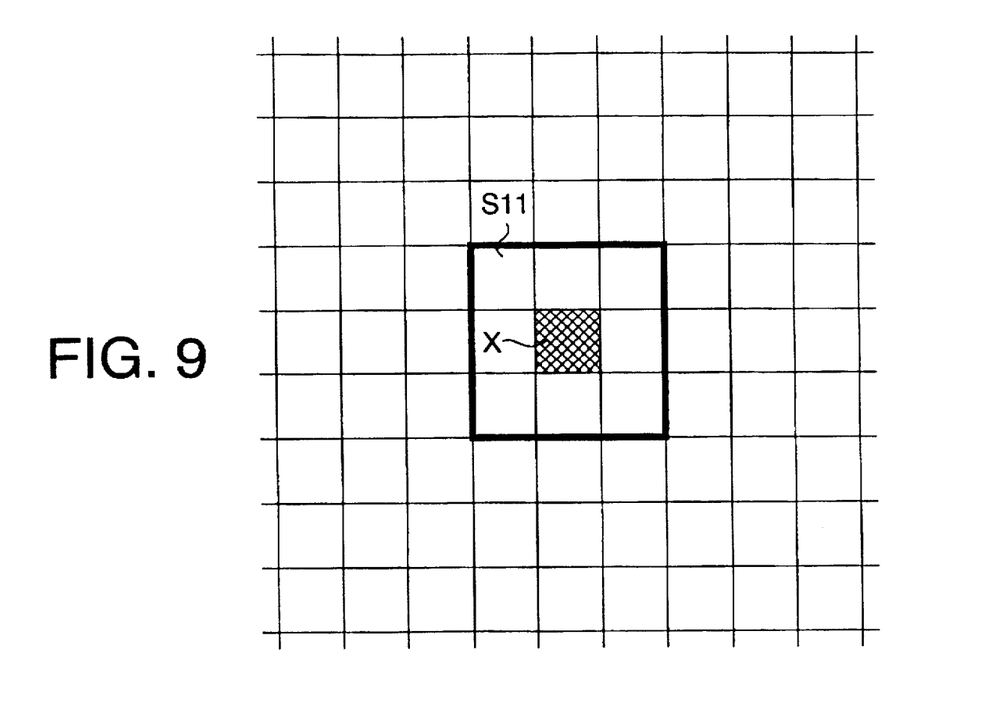
FIG. 9 is an enlarged diagram of the matrix which is subject to yet another smoothing process according to another pattern.
Figure 10A:
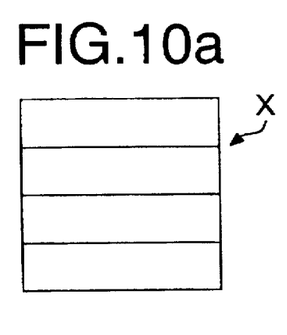
Figure 10B:
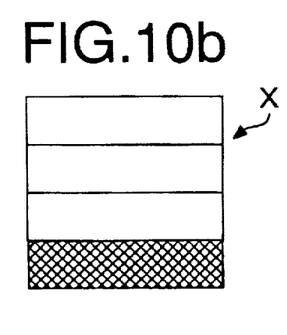
Figure 10C:
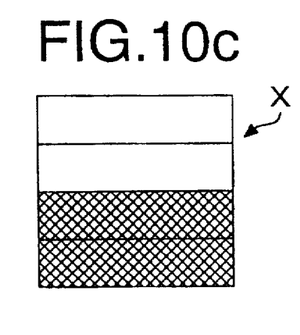
Figure 10D:
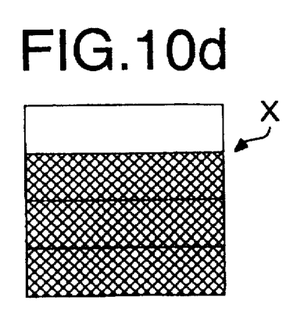
Figure 10E:
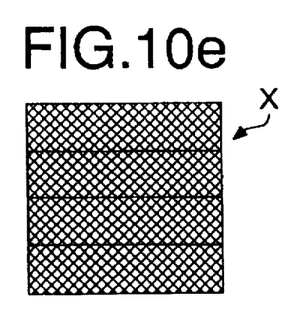

Furthermore, supposing that the pre-smoothing process image data is the pattern as shown in FIG.9 (in short, this is when a solitary black point has been generated because of data conversion mistake and the like) and area S11 (bold) having 3×3 pixel data is read into the matrix production part M, this pattern is recognized by the judging/line density conversion circuit 23 as corresponding to the specific pattern Sg shown in FIG. 5(a) and new pixel data d9 d14 in the specific pattern Sg are white pixel data in FIG.9. Accordingly, in area S11, both parts of the target pixel data X are converted to white pixel data as shown in the aforementioned FIG.6 (c). In short, the solitary point is erased.

Due to the construction as described above, the present embodiment demonstrates the following effectiveness.

(1) Compared to the execution of a smoothing process based on only the black-white pattern of the target pixel data X and the eight pixel data D1–D8 in the matrix production part M, as processing is carried out according to newly recognized pixel data d1–d14, more precise smoothing can be performed.

(2) Normally, the smoothing process is carried out based on the black-white pattern of the eight pixel data D1–D8 or on the 3×3 pixel data including the target pixel data X, and the new pixel data (d1–d14) are referred to only when there is a specific pattern. As a result, not only is more precise smoothing possible, but complications involving the processing for the smoothing are prevented.

(3) In the present embodiment, smoothing and line density conversion are carried out simultaneously. Accordingly, when the line density is multiplied by a predetermined factor, multiplication is not done simply with the same black-white pattern as the pixel data of the received image data, but it is divided, for example, into the upper white pixel data and the lower black pixel data as shown in FIG. 6(a) (in short, only half the pixel is black in this case). Thus a more detailed smoothing is possible.

(4) In the present embodiment, other pixel data (new pixel data d1–d14) of the pixel memory 22 in the main scanning direction are recognized. As the line data is memorized 3 lines at a time in the line buffer 21 and then conveyed to the memory 22 in the main scanning direction as long as other pixel data are recognized in the main scanning direction, there is no need to increase the line buffer 21 and as a result the cost can be reduced.

(5) When smoothing is carried out by the present embodiment, the pre-smoothing pixel data in the pixel memory 22 is always referred to as the other pixel data existing in the main scanning direction. As a result, there is no need to arrange a memory for memorization of the post-smoothing process image data, and if smoothing is carried out by referring to the pre-smoothing process pixel data, there is no effect on the post-processing data even if smoothing is carried out in one page of image data. Therefore, the flexibility in determining the start position and proceeding order of the smoothing process in one page of image data increases.

It should be noted that the following arrangements are also possible on the present embodiment.

a) In the aforementioned embodiment, fine mode image data is received and printed out after the line density has been doubled to superfine mode. However, image data of normal mode may of course be received and printed out in fine mode and image data of normal mode may be printed out after the line density has been quadrupled to superfine mode. In the latter case (quadrupling), as five patterns as shown in FIGS. 10(a–d) can be used as smoothing patterns, more detailed and precise smoothing is possible.

b) In the aforementioned embodiment, the dot matrix has 3×3 pixel data but since the purpose of the dot-matrix is to allow the identity (back or white) of the target pixel data X to be determined from the pixel data surrounding the target pixel data X, the composition of dot matrix may include 5×5, 4×7 or n×m in general.

c) In the aforementioned embodiment, the line data conveyed and memorized in the page memory 17 is transferred to the judging/line density conversion circuit 23 of the smoothing process circuit 18 and smoothing and line density conversion is carried out. However, line density conversion may be carried out by the CPU 11, ROM 12 and RAM 13 and only smoothing is carried out in the smoothing process circuit 18.

d) In the aforementioned embodiment, an example of the case where a black solitary point is erased was given. However, a similar idea can be applied to the erasing of a solitary white point of pixel data in black pixel data.

e) The present invention can be realized in a printer.

Apart from the above, the embodiments of the present invention may be changed or modified within the spirit and the scope of the invention.

What is claimed is:

1. An image processing apparatus having a smoothing function that determines whether a predetermined pixel data is black or white based on black-white pattern of other pixel data existing in a predetermined area, arranged with, judging means for judging whether a predetermined pixel data is black or white by referring to the black-white pattern of other pixel data existing in the main scanning direction of the predetermined pixel data when black-white pattern of pixel data in a predetermined area is a specific pattern.

2. The image processing apparatus as in claim 1, wherein line density conversion means for converting line density of image data by multiplication by a predetermined factor is arranged with the judging means.

3. The image processing apparatus as in claim 1, wherein the judging means judges black-white pattern of the predetermined pixel to be same as that of other pixels when all the pixels apart from the predetermined pixel are black or white.

4. The image processing apparatus as in claim 1, wherein the predetermined area is a n×m matrix and the black-white pattern of other pixel data adjacent to this n×m matrix in the main scanning direction are referred to in order to judge whether the predetermined pixel data is black or white when the black-white pattern of pixel data in a predetermined area is a specific pattern.

5. The image processing apparatus as in claim 1, wherein the judging means refers to pre-smoothing pixel data.

6. The image processing apparatus as in claim 1, wherein line density conversion by the line density conversion means and judgment for smoothing by the judging means are done simultaneously.

* * * * *